(12) United States Patent
Tashima

(10) Patent No.: US 8,607,092 B2
(45) Date of Patent: Dec. 10, 2013

(54) RAID DEVICE, ABNORMAL DEVICE DETECTING APPARATUS, AND ABNORMAL DEVICE DETECTING METHOD

(75) Inventor: Hiroki Tashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 329 days.

(21) Appl. No.: 13/011,098

(22) Filed: Jan. 21, 2011

(65) Prior Publication Data

US 2011/0191641 A1 Aug. 4, 2011

(30) Foreign Application Priority Data

Feb. 3, 2010 (JP) ................................ 2010-022582

(51) Int. Cl.
*G06F 11/00* (2006.01)
(52) U.S. Cl.
USPC ........................................ 714/6.22; 714/54
(58) Field of Classification Search
USPC .................... 714/6.2, 6.21, 6.22, 54
See application file for complete search history.

(56) References Cited

U.S. PATENT DOCUMENTS

| 6,961,767 | B2 * | 11/2005 | Coffey et al. ................ 709/224 |
| RE42,228 | E * | 3/2011 | Westby et al. ................ 714/805 |
| 2001/0011357 | A1 * | 8/2001 | Mori ................ 714/25 |
| 2006/0026471 | A1 * | 2/2006 | Kubota et al. ................ 714/724 |
| 2006/0146698 | A1 * | 7/2006 | Ukrainetz et al. ........... 370/221 |
| 2006/0182110 | A1 * | 8/2006 | Bornhoff et al. ............. 370/392 |
| 2006/0274646 | A1 | 12/2006 | Nakamura et al. |
| 2008/0068987 | A1 * | 3/2008 | Hida et al. .................... 370/222 |
| 2008/0215809 | A1 | 9/2008 | Otaka et al. |
| 2011/0179310 | A1 * | 7/2011 | Fujigaya ......................... 714/42 |
| 2011/0216778 | A1 * | 9/2011 | Chung et al. .................. 370/401 |

FOREIGN PATENT DOCUMENTS

| JP | H10-69459 | 3/1998 |
| JP | 2001-306262 | 11/2001 |
| JP | 2002-091708 | 3/2002 |
| JP | 2003-158526 A | 5/2003 |
| JP | 2005-208971 | 8/2005 |
| JP | 2006-338374 | 12/2006 |
| JP | 2008-186377 | 8/2008 |

OTHER PUBLICATIONS

Cummings, Roger et al. "Fibre Channel Arbitrated Loop (FC-AL) Rev 4.5", Jun. 1, 1995, pp. 1-92.
Japanese Office Action mailed Oct. 8, 2013 for correspinding Japanese Application No. 2010-022582, with English-language translation.

* cited by examiner

*Primary Examiner* — Marc Duncan
(74) *Attorney, Agent, or Firm* — Fujitsu Patent Center

(57) ABSTRACT

A RAID device has a plurality of HDDs for a RAID configuration and controls the RAID configuration. The RAID device has a host that performs various data processes on the HDDs and a control unit that controls communication with the HDDs. With this configuration, if an initialization process for assigning physical addresses unique to the HDDs is performed, the RAID device receives initialization frames from the HDDs. Then, the RAID device detects abnormality of the HDDs in accordance with information contained in the received initialization frames.

8 Claims, 11 Drawing Sheets

| | S_ID | D_ID |
|---|---|---|
| TRANSMISSION | 00 | 00 |
| RECEPTION | 00 | 00 |

| | S_ID | D_ID |
|---|---|---|
| TRANSMISSION | 11 | 0F |
| RECEPTION | 11 | 0F |

| | S_ID | D_ID |
|---|---|---|
| TRANSMISSION | EF | EF |
| RECEPTION | 11 | 0F |

|  | S_ID | D_ID | WWN |
|---|---|---|---|
| TRANSMISSION | 00 | EF | yyyy |
| RECEPTION | 00 | EF | |

RAID DEVICE, ABNORMAL DEVICE DETECTING APPARATUS, AND ABNORMAL DEVICE DETECTING METHOD

CROSS-REFERENCE TO RELATED APPLICATION

This application is based upon and claims the benefit of priority of the prior Japanese Patent Application No. 2010-022582, filed on Feb. 3, 2010, the entire contents of which are incorporated herein by reference.

FIELD

The embodiments discussed herein are directed to a RAID device, an abnormal device detecting apparatus, and an abnormal device detecting method.

BACKGROUND

Devices incorporating a redundant array of inexpensive disks (RAID) are in common use. Such devices function as storing units that include a plurality of devices corresponding to fibre channel interfaces (hereinafter, referred to as "FC I/Fs"), such as hard disk drives (HDDs) or solid state drives (SSDs).

The RAID devices store therein, in a redundant manner, data stored in devices that constitute a RAID, such as RAID-0 or RAID-5, so that the RAID devices can hold data to be stored even when a single device fails because RAID controllers of the RAID devices perform the overall control of the RAID devices, i.e., control the RAID level, such as RAID-0 or RAID-5.

Furthermore, each device corresponding to an FC I/F has two FC I/Fs. The RAID controllers also have two-system device adapters (hereinafter, referred to as "DAs") that directly access two corresponding FC I/Fs that are included in the devices. The maximum number of devices that can be connected to a single DA is 126.

Such a RAID device recognizes devices connected to the RAID device by using an initialization process (loop initialization) of the FC I/Fs or "Port Login". Specifically, when the RAID device starts the initialization process of the FC I/Fs, among all of the devices including the DAs, the RAID device compares world wide names (WWNs) assigned to each device. Then, the RAID device determines that a device that holds the minimum WWN is a loop master. In other words, a loop master is determined in accordance with a comparison of the WWNs among the devices.

Specifically, each device connected to the RAID device sends a frame that includes the WWN of the device to the subsequent device on an FC loop path. Then, if the device receives a frame that includes a WWN from another device, the device determines whether the WWN is greater than the WWN that is held by the device. If the WWN that is included in the received frame is greater than the WWN held by the device, the device adds the WWN held by the device to the received frame and sends the frame to the subsequent device on the FC loop path. In contrast, if the WWN that is included in the received frame is smaller than the WWN held by the device, the device sends that frame without processing anything to the subsequent device on the FC loop path. After all of the devices perform the above-described comparison and update of the WWN, a device that receives a frame that includes its own WWN is determined to be the loop master.

Subsequently, the loop master assigns, to each device, a physical address, i.e., an Arbitrated Loop Physical Address (AL_PA), creates a MAP of the AL_PA starting from an AL_PA of the loop master, obtains, for example, a connection location of each device, and completes the initialization process.

Thereafter, DAs of the RAID controllers issue, to each device, a "PortLogin" command, obtain a WWN from each device, and recognize each device connected thereto. Then, the RAID controllers compare, for each device, WWNs obtained by the two-system DAs. If the WWNs match, the WWNs obtained by the DAs are recognized as the WWN of the device.

Patent Document 1: Japanese Laid-open Patent Publication No. 10-069459
Patent Document 2: Japanese Laid-open Patent Publication No. 2003-158526
Patent Document 3: Japanese Laid-open Patent Publication No. 2005-208971
Non-patent Document 1: "Fibre channel arbitrated loop (FC-AL) Rev. 4.5", working draft proposal *American National Standard for Information Technology*, Jun. 1, 1995

However, with the conventional technology, there is a problem in that a device in which abnormality occurs at a protocol level may not be detected. Specifically, with the conventional technology, because detection of electrical failure that is output from a device is performed, it is not possible to detect, as an abnormal device, a device that seems to be operating normally. For example, it is not possible to detect a device in which a bit error occurs in a loop initialization select master (LISM) frame that is transmitted/received by each device in the initialization process and that is used for determining the loop master.

Specifically, a case in which an abnormal device may not be detected is a case both in which a bit error occurs in an S_ID or a D_ID that is an identifier included in the LISM frame and is also in which a cyclic redundancy check (CRC), corresponding to the S_ID or the D_ID in which the bit error occurs, is added. In such a case, because the CRC is not abnormal, the RAID device erroneously recognizes the value of the S_ID or the D_ID as a normal value even though it is an incorrect value representing an abnormal state. As a result, the RAID device controls each device connected to the RAID device without detecting the abnormality and therefore the normal operation of the DA may not be guaranteed.

Furthermore, a case in which an abnormal device may not be detected is a case both in which a bit error occurs in a WWN that is included in the LISM frame and also in which the device adds a CRC corresponding to a WWN where a bit error occurs. Each device compares the WWN in the received LISM frame with the WWN that is held by each device. If a WWN held by a device is smaller than the WWN in the received LISM frame, the device sends its own WWN to the subsequent device by adding its own WWN to the LISM frame. Accordingly, if the RAID device receives a LISM frame that passes each device, the RAID device determines the WWN that is added to the LISM frame as the WWN having the minimum value and determines the device that holds that WWN as a loop master. Specifically, because the RAID device may not recognize the WWNs of all devices, the RAID device may not determine whether a WWN added to the LISM frame passing each device is a WWN having the minimum value due to the bit error.

As a result, the RAID device erroneously determines the device that holds the WWN having the minimum number due to the bit error as a loop master; therefore, the operation of the RAID device itself may not be guaranteed. A physical address of a sending source is stored in the S_ID after initialization and a physical address of a destination is stored in the D_ID after initialization.

SUMMARY

According to an aspect of an embodiment of the invention, a RAID device includes a plurality of devices for a RAID configuration; a control unit that controls the RAID configuration and controls communication between the devices and a host that performs various data processes with respect to the devices; a frame receiving unit that receives, if an initialization process for assigning a unique physical address to each of the devices is performed, an initialization frame from each of the devices; and an abnormality detecting unit that detects abnormality of the devices in accordance with information contained in the initialization frame received by the frame receiving unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Preferred embodiments of the present invention will be explained with reference to accompanying drawings. The present invention is not limited to the embodiments described below.

[a] First Embodiment

Figure 1:
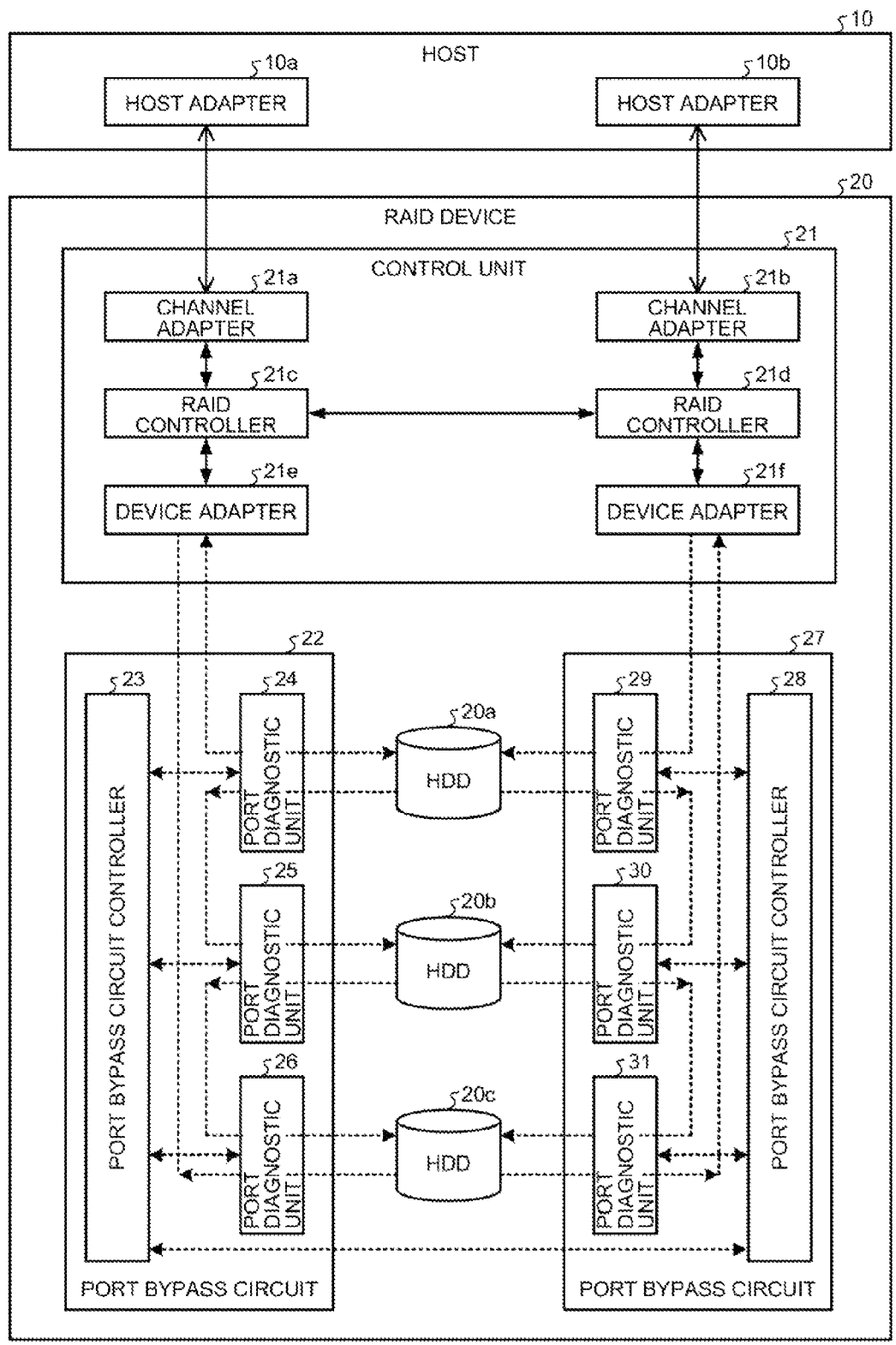
FIG. 1 is a block diagram illustrating the configuration of a RAID device according to a first embodiment.

FIG. 1 is a block diagram illustrating the configuration of a redundant array of inexpensive disks (RAID) device according to a first embodiment. As illustrated in FIG. 1, a RAID device 20 is connected to a host 10, functioning as a server device, that stores data in the RAID device 20 or reads data from the RAID device 20 using a fibre channel (FC) or Internet Small Computer System Interface (iSCSI).

As illustrated in FIG. 1, the RAID device 20 has a hard disk drive (HDD) 20a, an HDD 20b, an HDD 20c, a control unit 21, a port bypass circuit 22, and a port bypass circuit 27. The RAID device 20 is connected to the host 10 using two-system communication paths. Furthermore, the RAID device 20 is also connected to the control unit 21, the HDDs 20a to 20c, and the port bypass circuits 22 and 27 using two-system communication paths. Accordingly, the RAID device 20 can normally communicate even when any one of the paths is disconnected.

The HDDs 20a, 20b, and 20c are devices constituting a RAID, such as RAID-0 or RAID-5, and store therein data that is stored by the host 10. Each HDD has two fibre channel interfaces (hereinafter, referred to as "FC I/Fs"). Each HDD is connected to another HDD, the control unit 21, and two port bypass circuits using a fabric connection (FC-SW) or a Fibre Channel Arbitrated Loop (FC-AL) connection.

The control unit 21 connects, a channel adapter 21a and a channel adapter 21b, a RAID controller 21c and a RAID controller 21d, and a device adapter 21e and a device adapter 21f via, for example, a PCI Express.

The channel adapter 21a controls the communication with a host adapter 10a in the host 10 connected via, for example, an FC or an iSCSI. Furthermore, the channel adapter 21a controls the communication with the RAID controller 21c connected via, for example, a PCI Express. Similarly, the channel adapter 21b controls the communication with a host adapter 10b in the host 10 connected, for example, via an FC or an iSCSI. Furthermore, the channel adapter 21b controls the communication with the RAID controller 21d connected via, for example, a PCI Express.

The RAID controller 21c is connected to the channel adapter 21a, the RAID controller 21d, and the device adapter 21e via, for example, a PCI Express. Furthermore, the RAID controller 21c performs parity calculation, manages devices or disks, and controls the RAID configuration constituted by the HDDs 20a, 20b, and 20c. In other words, the RAID controller 21c controls various processes, such as the writing or reading of data, with respect to the HDDs 20a, 20b, and 20c.

In a similar manner as in the RAID controller 21c, the RAID controller 21d is connected to the channel adapter 21b, the RAID controller 21c, and the device adapter 21f via, for example, a PCI Express. Furthermore, the RAID controller 21d performs parity calculation, manages disks, and controls the RAID configuration constituted by the HDDs 20a, 20b, and 20c. In other words, the RAID controller 21d controls various processes, such as the writing or reading of data, with respect to the HDDs 20a, 20b, and 20c.

The device adapter 21e is, for example, an initiator that is connected to the RAID controller 21c via, for example, a PCI Express and that is connected to each HDD via the port bypass circuit 22 using an FC. For example, the device adapter 21e performs an FC loop connection in which the port diagnostic units in the port bypass circuit 22 are connected to their corresponding HDDs. The FC loop mentioned here is the state in which the device adapter 21e is connected to each port diagnostic unit in the port bypass circuit 22 using a loop connection. Specifically, connection is established from the device adapter 21e to a port diagnostic unit 24, from the port diagnostic unit 24 to the HDD 20a, from the HDD 20a to the port diagnostic unit 24, and from the port diagnostic unit 24 to a port diagnostic unit 25. Furthermore, connection is established from the port diagnostic unit 25 to the HDD 20b, from the HDD 20b to the port diagnostic unit 25, from the port diagnostic unit 25 to a port diagnostic unit 26, from the port diagnostic unit 26 to the HDD 20c, from the HDD 20c to the port diagnostic unit 26, and from the port diagnostic unit 26 to the device adapter 21e.

In a similar manner as in the device adapter 21e, the device adapter 21f is, for example, an initiator that is connected to the RAID controller 21d via, for example, a PCI Express and that is connected to each HDD via the port bypass circuit 27 using an FC. For example, the device adapter 21f performs an FC loop connection in which the port diagnostic units in the port bypass circuit 27 are connected to their corresponding HDDs, respectively. Specifically, connection is established from the device adapter 21f to a port diagnostic unit 29, from the port diagnostic unit 29 to the HDD 20a, from the HDD 20a to the port diagnostic unit 29, and from the port diagnostic unit 29 to a port diagnostic unit 30. Furthermore, connection is established from the port diagnostic unit 30 to the HDD 20b, from the HDD 20b to the port diagnostic unit 30, from the port diagnostic unit 30 to a port diagnostic unit 31, from the port diagnostic unit 31 to the HDD 20c, from the HDD 20c to the port diagnostic unit 31, and from the port diagnostic unit 31 to the device adapter 21f.

The port bypass circuit 22 has a port bypass circuit controller 23, the port diagnostic unit 24, the port diagnostic unit 25, and the port diagnostic unit 26, all of which are connected via an FC. The port bypass circuit 22 and the port bypass circuit 27 have the same configuration; therefore, only the configuration of the port bypass circuit 22 will be described here. Furthermore, the port diagnostic unit 24, the port diagnostic unit 25, and the port diagnostic unit 26 have the same configuration; therefore, only the configuration of the port diagnostic unit 24 will be described here.

The port bypass circuit controller 23 is a control unit that performs the overall control of the port bypass circuit 22. For example, in accordance with the connection state, such as fabric connection or FC-AL connection, the port bypass circuit controller 23 controls data that is transmitted through the FC interface to which the device adapter 21e, the port diagnostic unit 24, the port diagnostic unit 25, and the port diagnostic unit 26 are connected.

Figure 2:
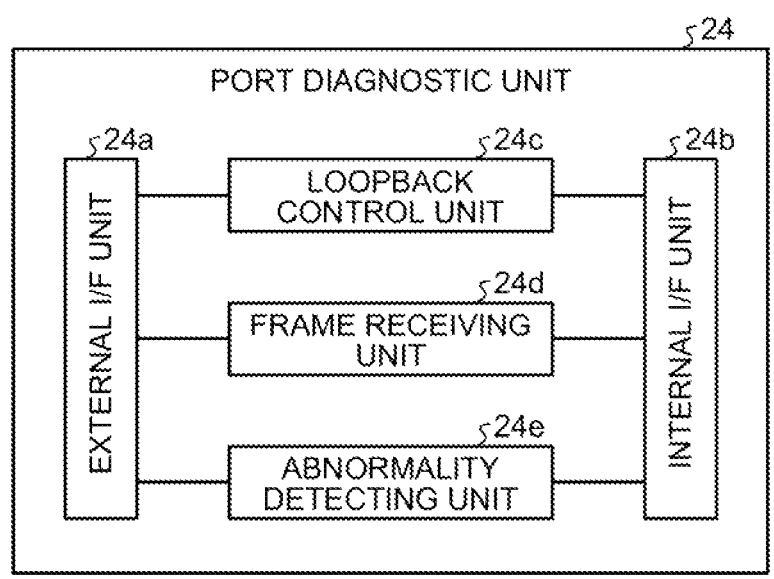
FIG. 2 is a block diagram illustrating a port diagnostic unit in detail.

The port diagnostic unit 24 is a control unit that controls the communication between, for example, the device adapter 21e and the HDD 20a. As illustrated in FIG. 2, the port diagnostic unit 24 has an external I/F 24a, an internal I/F 24b, a loopback control unit 24c, a frame receiving unit 24d, and an abnormality detecting unit 24e. FIG. 2 is a block diagram illustrating the port diagnostic unit in detail.

The external I/F 24a is an interface that controls the communication from the control unit 21 or from another port diagnostic unit to the device constituting the RAID. For example, the external I/F 24a receives various requests received from the device adapter 21e in the control unit 21 or forwards various requests to the port diagnostic unit 25.

The internal I/F 24b is an interface that controls the communication between devices constituting the RAID and the port diagnostic unit 24. For example, the internal I/F 24b receives, from the HDD 20a, a response to a request for writing or reading data that is performed with respect to the HDD 20a, forwards the response on the FC loop, and sends it to the control unit 21. Furthermore, the internal I/F 24b forwards, on the FC loop, the request for writing or reading data that is performed with respect to devices other than the HDD 20a and forwards it to another device via the external I/F 24a.

Figure 3:
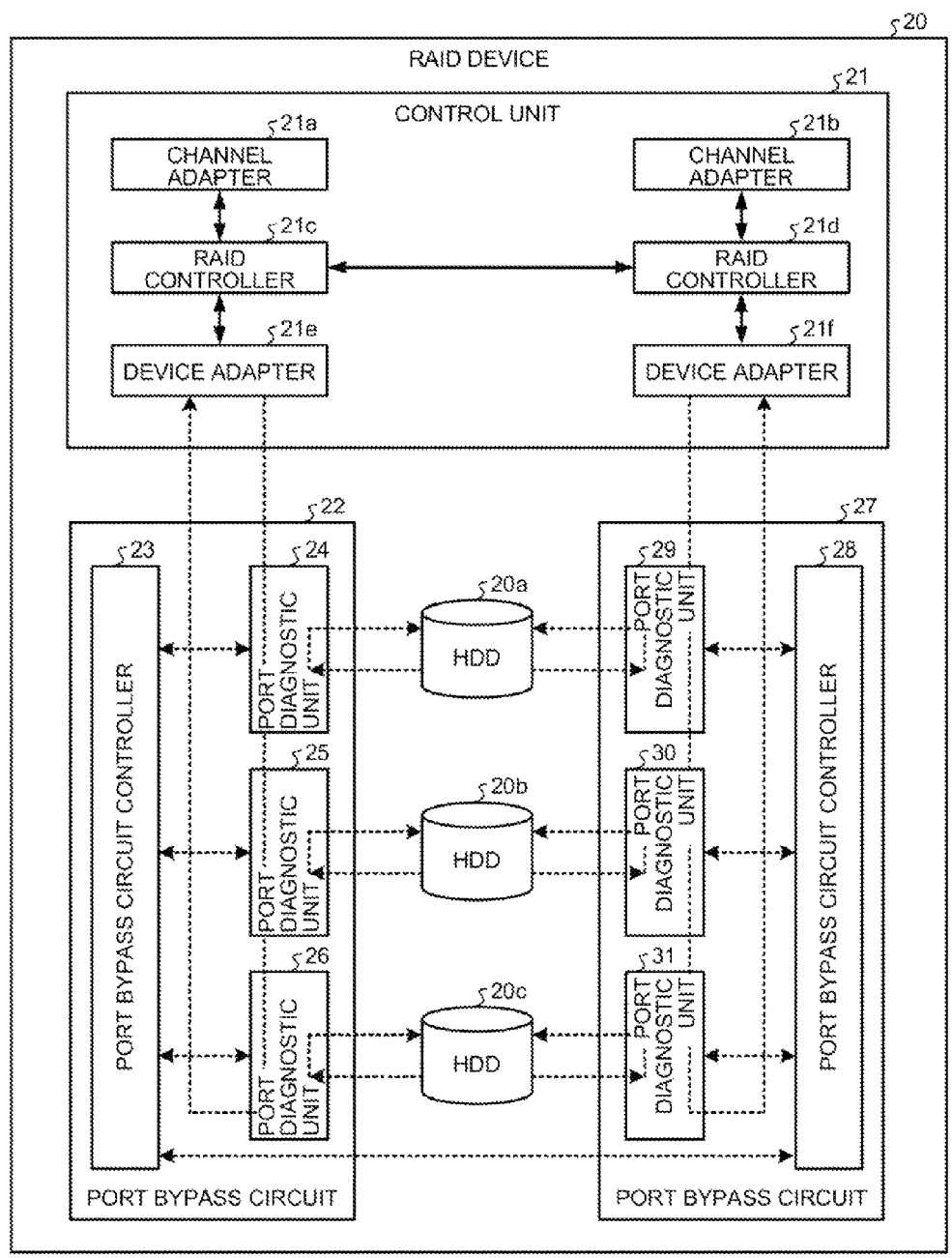
FIG. 3 is a block diagram illustrating a loopback connection of a port diagnostic unit.

The loopback control unit 24c is connected to the external I/F 24a, the internal I/F 24b, the frame receiving unit 24d, and the abnormality detecting unit 24e. The loopback control unit 24c shifts the communication between the devices to a loopback state. For example, the loopback control unit 24c detects that a power supply of the RAID device 20 is turned on, a loop initialization primitive (LIP) is issued by the HDD 20a, and the LIP goes around the FC loop for one cycle. Then, as illustrated in FIG. 3, the loopback control unit 24c that detects the LIP shifts the communication with the HDD 20a to the loopback state so as to prevent the frame that is output from the HDD 20a from being sent to the other HDDs or the like. FIG. 3 is a block diagram illustrating a loopback connection of a port diagnostic unit.

If an initialization process for assigning unique physical address to devices that have a fibre channel is started, the frame receiving unit 24d receives, from the devices, initialization frames that perform the initialization process. Specifically, if an initialization process for assigning a unique physical address to the HDD 20a is started, the frame receiving unit 24d receives, from the HDD 20a, an initialization frame that performs the initialization process and outputs the initialization frame to the abnormality detecting unit 24e, which will be described later.

For example, the frame receiving unit 24d has a port name constituted by its world wide name (WWN) and receives, from the HDD 20a, a loop initialization select master (LISM) frame that determines a loop master. The frame receiving unit 24d receives, from the HDD 20a, a loop initialization fabric assigned (LIFA) frame that has bits corresponding to a fabric address. The frame receiving unit 24d receives, from the HDD 20a, a loop initialization previously acquired (LIPA) frame that has bits corresponding to the previously assigned AL_PA.

Furthermore, the frame receiving unit 24d receives, from the HDD 20a, a loop initialization hard assigned (LIHA) frame that has a bit corresponding to an SEL-ID that holds seven signal lines for a connector of an HDD that is assigned as hardware. If the bit corresponding to its own address has already been set to 1 before the frame reaches the LIHA, the frame receiving unit 24d receives, from the HDD 20a, a loop initialization soft assigned (LISA) frame that sets a higher priority bit to 1 from among the remaining bits of value 0. The frame receiving unit 24d receives, from the HDD 20a, a loop initialization report position (LIRP) frame that stores therein its own AL_PA and a loop initialization loop position (LILP) that notifies each device of the AL_PAs of all of the devices.

Figure 4:
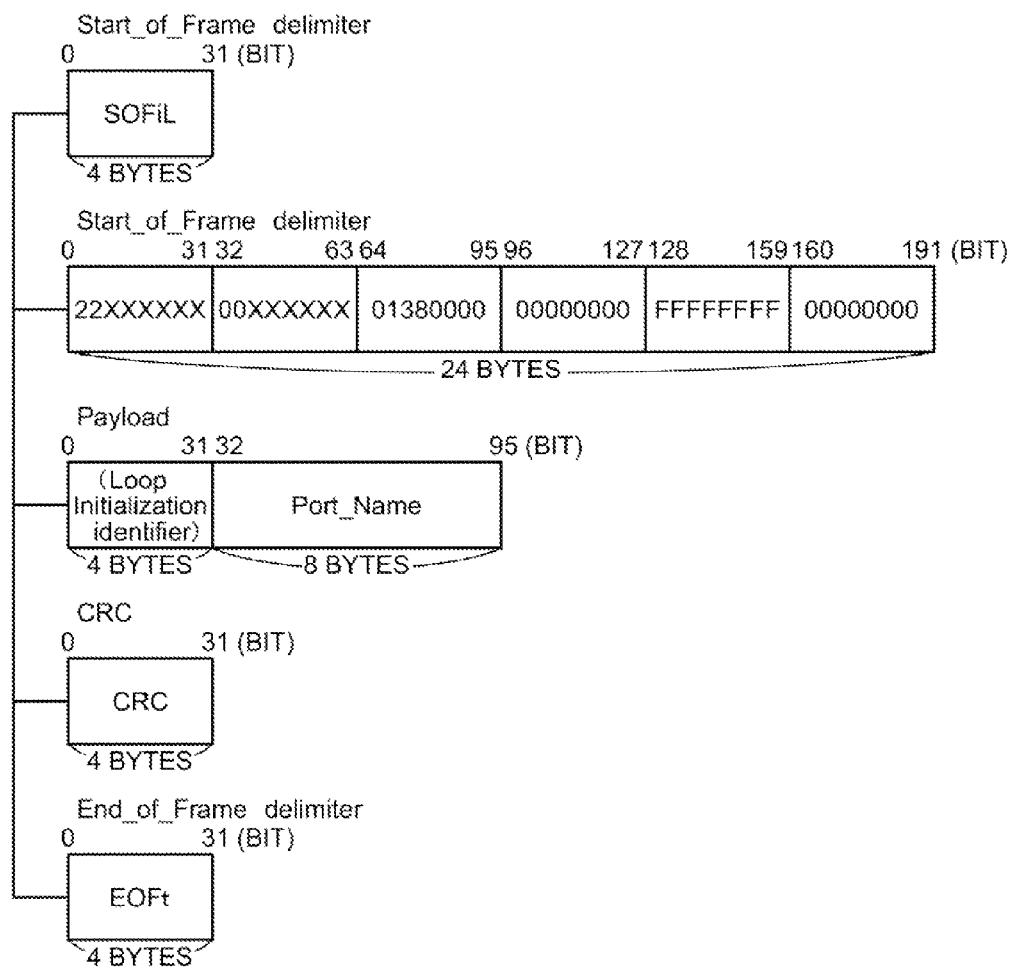
FIG. 4 is a schematic diagram illustrating an example of the format of a LISM frame.

For example, if the frame receiving unit 24d receives the LISM frame illustrated in FIG. 4, the frame receiving unit 24d outputs the LISM frame to the abnormality detecting unit 24e, which will be described later. FIG. 4 is a schematic diagram illustrating an example of the format of the LISM frame. As illustrated in FIG. 4, the LISM frame has a 4-byte "Start_of_

Frame delimiter", a 24-byte "Frame_Header", a 12-byte "Payload", a 4-byte "CRC", and a 4-byte "End_of_Frame delimiter".

The "Start_of_Frame delimiter" is information indicating the start of the frame. The "Frame_Header" is header information of the LISM frame. The "CRC" is an error detection code indicating whether the frame is normal. The "End_of_Frame delimiter" is information indicating the end of the frame.

The "Payload" is the main body of the data of the frame. The "Payload" has a 4-byte "Loop Initialization identifier" and an 8-byte "Port_Name" indicating that the frame is the LISM frame. For example, in the case of an LISM frame, the "Loop Initialization identifier" stores therein "11010000" represented in hexadecimal numbers, and the "Port_Name" stores therein a WWN. In the case of an LIFA frame, the frame is 20-byte information in total: the "Loop Initialization identifier" stores therein "11020000" represented in hexadecimal numbers and has a 16-byte "Fabric Assign AL_PA bit map". In the case of an LIPA frame, the frame is 20-byte information in total: the "Loop Initialization identifier" stores therein "11030000" represented in hexadecimal numbers and has a 16-byte "Previously Acquired AL_PA bit map".

Furthermore, in the case of an LIPA frame, the frame is 20-byte information in total: the "Loop Initialization identifier" stores therein "11040000" represented in hexadecimal numbers and has a 16-byte "Hard Assigned AL_PA bit map". In the case of an LISA frame, the frame is 20-byte information in total: the "Loop Initialization identifier" stores therein "11050000" represented in hexadecimal numbers and has a 16-byte "Soft Assigned AL_PA bit map". In the case of an LIRP frame, the frame is 132-bytes information in total: the "Loop Initialization identifier" stores therein "11060000" in hexadecimal numbers and has a 128-byte "Report AL_PA position map". In the case of an LILP frame, the frame is 132-byte information in total: the "Loop Initialization identifier" stores therein "11070000" represented in hexadecimal numbers and has a 128-byte "Loop AL_PA position map".

Referring back to FIG. 2, the abnormality detecting unit 24e detects an abnormality of a device in accordance with information contained in the initialization frame received by the frame receiving unit 24d. Specifically, if an S_ID and a D_ID contained in the initialization frame received from the HDD 20a are neither "00" nor "EF", the abnormality detecting unit 24e detects, as an abnormal device, the HDD 20a that is the source device of the initialization frame. In the example illustrated in FIG. 4, if "xxxxxx" of the "Frame_Header" of the initialization frame received by the frame receiving unit 24d is neither "000000" nor "0000EF", the abnormality detecting unit 24e detects the HDD that sends the subject frame as abnormal. The S_ID stores therein a source AL_PA after the initialization and is a fixed value when the initialization process is performed. Furthermore, the S_ID stores therein a destination AL_PA after the initialization and is a fixed value when the initialization process is performed. If each HDD is connected via an FC-FL connection, the abnormality detecting unit 24e determines whether the initialization frame is "0000EF". If each HDD is connected via an FC-SW connection, the abnormality detecting unit 24e determines whether the initialization frame is "000000".

Flow of a Process

Figure 5:
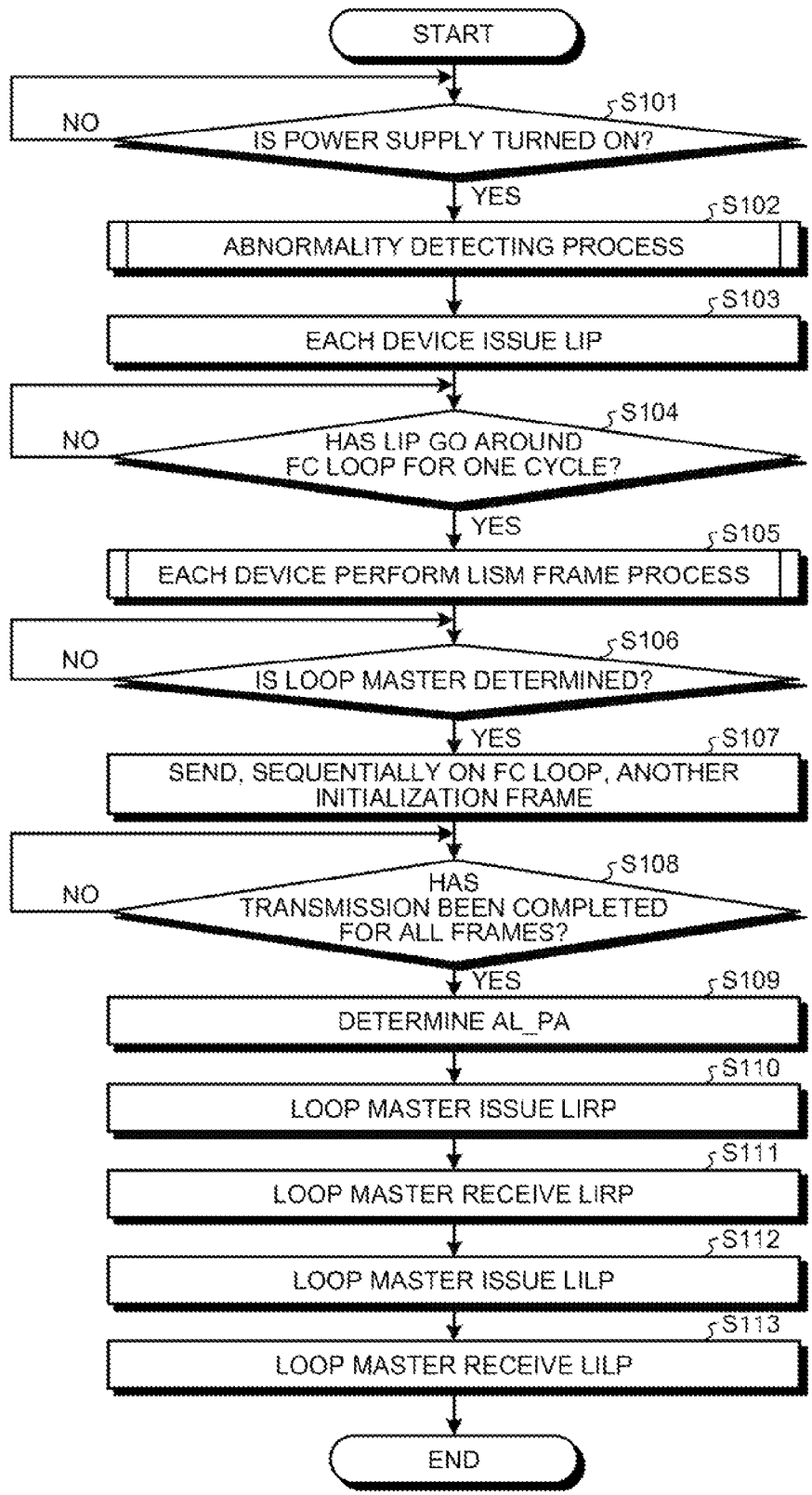
FIG. 5 is a flowchart illustrating the flow of an initialization process performed by the RAID device according to the first embodiment.
Figure 6:
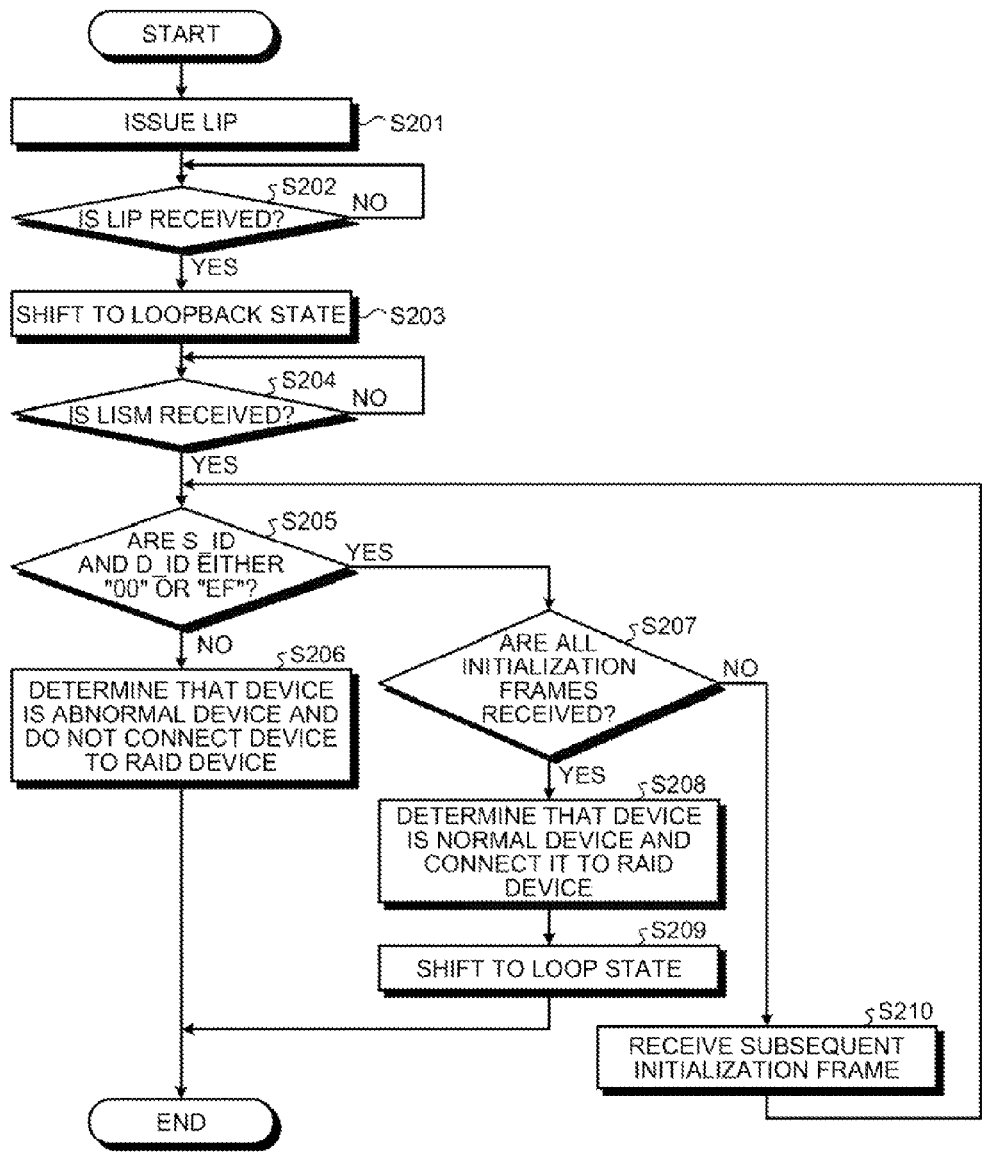
FIG. 6 is a flowchart illustrating the flow of an abnormality detecting process in the initialization process.
Figure 7:
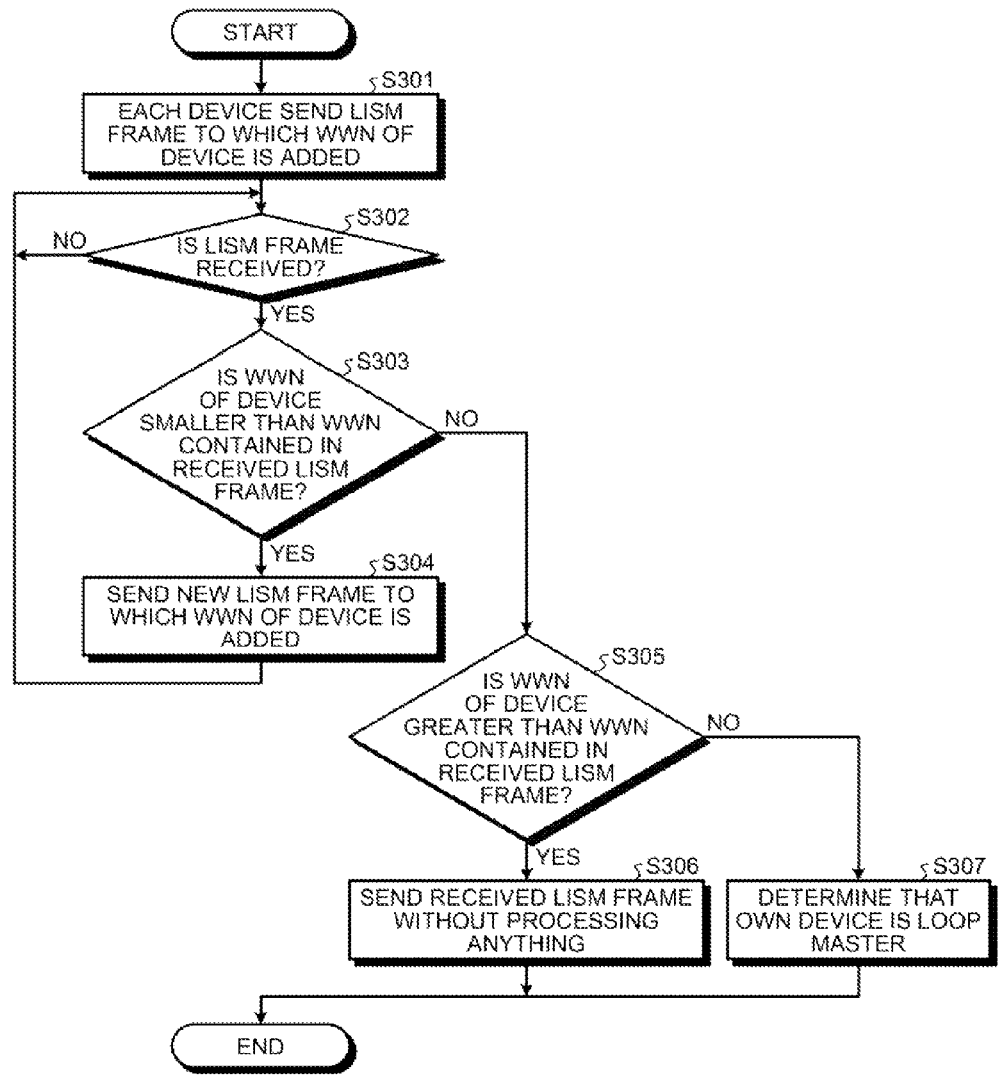
FIG. 7 is a flowchart illustrating the flow of a LISM frame process performed by each device in the initialization process.

In the following, the flow of the initialization process performed by the RAID device will be described with reference to FIGS. 5 to 7. FIG. 5 is a flowchart illustrating the flow of the initialization process performed by the RAID device according to the first embodiment. FIG. 6 is a flowchart illustrating the flow of an abnormality detecting process in the initialization process. FIG. 7 is a flowchart illustrating the flow of a LISM frame process performed by each device in the initialization process.

Overall Flow of the Initialization Process

As illustrated in FIG. 5, if a power supply is turned on (Yes at Step S101), the RAID device 20 performs the abnormality detecting process (Step S102). Then, each device in the RAID device 20 that completes the abnormality detecting process issues an LIP (Step S103). If each LIP goes around the FC loop for one cycle (Yes at Step S104), a LISM frame process is performed by each device (Step S105).

Thereafter, if a loop master is determined (Yes at Step S106), the RAID device 20 sends, sequentially on the FC loop, each frame of the LIFA, the LIPA, the LIHA, and the LISA, which are subsequent to the LISM (Step S107). If the transmission/reception of the frame has been completed (Yes at Step S108), the loop master of the RAID device 20 determines the AL_PAs of all of the devices (Step S109).

Subsequently, the loop master of the RAID device 20 issues an LIRP frame to the FC loop (Step S110) and receives the LIRP frame that has passed all of the devices (Step S111). Then, the loop master of the RAID device 20 issues an LILP frame to the FC loop (Step S112), receives the LILP frame that has passed all of the devices, and completes the initialization process (Step S113).

Flow of the Abnormality Detecting Process

In the following, the flow of the abnormality detecting process that is performed at Step S102 in FIG. 5 will be described with reference to FIG. 6. As illustrated in FIG. 6, each device of the RAID device 20 (i.e., HDDs in FIG. 1) issues an LIP to the FC loop (Step S201). If the device receives the LIP that goes around the FC loop for one cycle (Yes at Step S202), the loopback control unit 24c in the port diagnostic unit 24 connected to the device shifts the connection state with respect to the HDD 20a to a loopback state (Step S203).

Then, if the frame receiving unit 24d receives the LISM frame that is sent from the HDD 20a (Yes at Step S204), the abnormality detecting unit 24e determines whether the S_ID and the D_ID contained in the LISM frame are either "00" or "EF" (Step S205).

If the S_ID and the D_ID are neither "00" nor "EF" (No at Step S205), the abnormality detecting unit 24e determines that the HDD 20a that sends the subject LISM frame is an abnormal device and controls the HDD 20a in such a manner that the HDD 20a is not connected to the RAID device 20 (Step S206). Specifically, the abnormality detecting unit 24e outputs, for example, an abnormal device detection alarm and prompts a maintenance person to replace a device or the like.

In contrast, if the S_ID and the D_ID are either "00" or "EF" (Yes at Step S205), the abnormality detecting unit 24e determines whether all of the initialization frames have been received (Step S207). Then, if all of the initialization frames have been received (Yes at Step S207), the abnormality detecting unit 24e determines that the HDD 20a is a normal device and connects the HDD 20a to the RAID device 20 (Step S208). Then, the loopback control unit 24c shifts the loopback state to the normal loop state (Step S209). Specifically, the port diagnostic unit 24 determines, as a normal device, all of the devices in which the S_ID and the D_ID of the initialization frame that is transmitted/received in the initialization process are either "00" or "EF".

Furthermore, if not all initialization frame have been received (No at Step S207), the abnormality detecting unit 24e receives the subsequent initialization frame (Step S210) and repeats the process at Step S205 and the subsequent processes.

Flow of the LISM Frame Process

In the following, the flow of the LISM frame process performed at Step S105 in FIG. 5 will be described with reference to FIG. 7. As illustrated in FIG. 7, a device sends, to the FC loop, a LISM frame to which the WWN of the device is added (Step S301). Then, if the device receives a LISM frame (Yes at Step S302), the device determines whether the WWN of the device is smaller than the WWN contained in the received LISM frame (Step S303). For example, the device determines whether the "Port name" of the "Payload" in the LISM frame is smaller than the WWN of the device.

If the WWN of that device is smaller than the WWN contained in the received LISM frame (Yes at Step S303), the device sends, to the FC loop, a new LISM frame to which the WWN of the device is added (Step S304).

In contrast, if the WWN of the device is not smaller than the WWN contained in the received LISM frame (No at Step S303), the device determines whether the WWN of the device is greater than the WWN contained in the received LISM frame (Step S305).

If the WWN of the device is greater than the WWN contained in the received LISM frame (Yes at Step S305), the device sends the received LISM frame to the subsequent destination without processing anything (Step S306).

In contrast, if the WWN of the device matches the WWN contained in the received LISM frame (No at Step S305), the device determines that the device is a loop master (Step S307).

Advantage of the First Embodiment

In this way, according to the first embodiment, if the initialization process for assigning unique physical addresses to devices, such as multiple HDDs, that have a fibre channel is started, initialization frames that perform the initialization process are received from respective multiple devices. Then, the abnormality of a device is detected in accordance with the information contained in the received initialization frames. As a result, it is possible to detect the abnormality of the device for the RAID before the device is connected to the RAID device 20. This makes it possible to detect abnormality at a protocol level in which it is difficult to detect the abnormality later.

Furthermore, with the method disclosed in the first embodiment, because abnormality diagnosis can be performed at a protocol level, it is possible to detect abnormality that may not be detected at a check code level that is added to output data. As a result, it is possible to detect abnormality of a device that seems to be operating normally. If the device for the RAID is connected to the RAID device 20 because such abnormality may not be detected in advance, it is difficult to specify a failed part. However, by diagnosing each device before the connection, it becomes easy to specify the failed part.

[b] Second Embodiment

In the first embodiment, a case has been described, as an example, in which, when the power supply of the RAID device 20 is turned on, by shifting the connection state with respect to the HDD to the loopback connection state, the initialization process is performed for each HDD, and, if abnormality is not present, the initialization process is performed by all of the devices. However, when the RAID device 20 is started, because the connection to the HDD is shifted to the loopback connection, the operation of the RAID device 20 itself needs to be stopped. Accordingly, in a second embodiment, a case will be described in which, even when a new HDD is added during startup of the RAID device 20, abnormality of the device is detected at a protocol level without stopping the operation of the RAID device 20 itself.

Configuration of a Port Diagnostic Unit

Figures 8, 9, 10, 11:
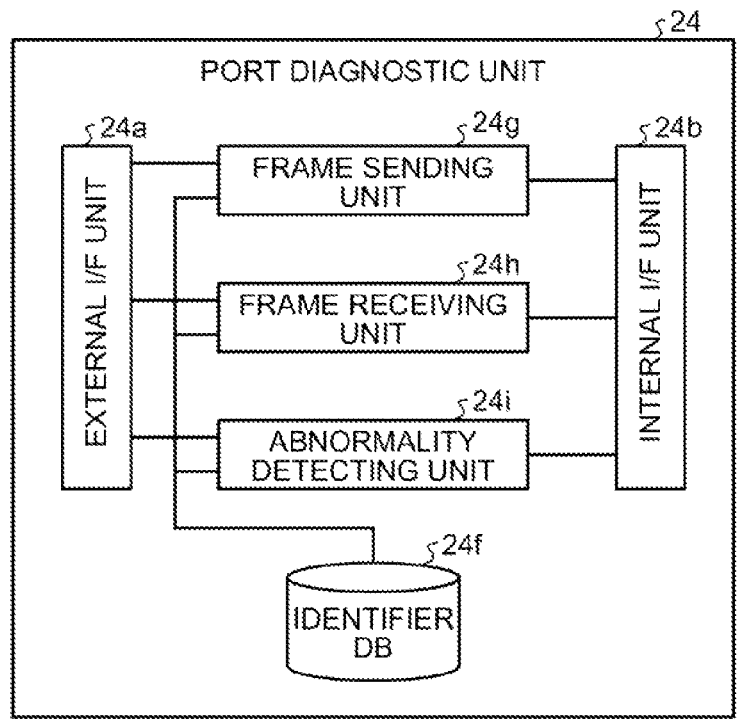
FIG. 8 is a block diagram illustrating, in detail, a port diagnostic unit according to a second embodiment.
FIG. 9 is a schematic diagram illustrating an example of information stored in an identifier DB according to the second embodiment.
FIG. 10 is a schematic diagram illustrating an example of information stored in the identifier DB according to the second embodiment.
FIG. 11 is a schematic diagram illustrating an example of information stored in the identifier DB according to the second embodiment.

First, a port diagnostic unit according to the second embodiment will be described with reference to FIG. 8. FIG. 8 is a block diagram illustrating, in detail, the port diagnostic unit according to a second embodiment. As illustrated in FIG. 8, the port diagnostic unit 24 has the external I/F 24a, the internal I/F 24b, an identifier DB 24f, a frame sending unit 24g, a frame receiving unit 24h, and an abnormality detecting unit 24i. The external I/F 24a and the internal I/F 24b have the same function as that described in the first embodiment; therefore, a description thereof is omitted here.

The identifier DB 24f stores therein an S_ID and a D_ID that are obtained when an initialization frame is sent to the HDD 20a. The identifier DB 24f also stores therein an S_ID and a D_ID that are obtained when an initialization frame is received from the HDD 20a. For example, as illustrated in FIG. 9, the identifier DB 24f stores therein "00 and 00" as the "S_ID and D_ID" "at the time of the transmission" and stores therein "00 and 00" as the "S_ID and D_ID" "at the time of the reception". FIG. 9 is a schematic diagram illustrating an example of information stored in the identifier DB according to the second embodiment.

If the frame sending unit 24g receives, from the device adapter 21e or another HDD, an initialization frame, such as an LISM, the frame sending unit 24g obtains the "S_ID and D_ID" contained in the subject initialization frame and stores them in the identifier DB 24f as the "S_ID and D_ID" at the time of the transmission. Then, the frame sending unit 24g sends the initialization frame to the destination HDD 20a. For example, the frame sending unit 24g obtains a value of "xxxxxxx" that is represented by bits 0 to 31 (from 0 bytes to 3 bytes) and a value of "xxxxxxx" that is represented by bits 32 to 63 (from 4 bytes to 7 bytes) and stores them. Bit 0 is the start of the "Payload" contained in the initialization frame.

If the frame receiving unit 24h receives an initialization frame, such as an LISM from the HDD 20a, the frame receiving unit 24h obtains the "S_ID and D_ID" contained in the initialization frame and stores them, in the identifier DB 24f, as the "S_ID and D_ID" at the time of the reception. Then, the frame receiving unit 24h sends the initialization frame to the device adapter 21e or another port diagnostic unit, which is the subsequent connection destination of the FC loop. For example, the frame receiving unit 24h obtains a value of "xxxxxxx" that is represented by bits 0 to 31 (from 0 bytes to 3 bytes) and a value of "xxxxxxx" that is represented by bits 32 to 63 (from 4 bytes to 7 bytes) and stores them. Bit 0 is the start of the "Payload" contained in the initialization frame.

In a similar manner as in the first embodiment, if the S_ID and the D_ID contained in the initialization frame received from the HDD 20a are neither "00" nor "EF", the abnormality detecting unit 24i detects the HDD 20a, which is the source device of the initialization frame, as an abnormal device. Specifically, if the S_ID and the D_ID contained in the initialization frame received from the HDD 20a are either "00" or "EF", the abnormality detecting unit 24i connects the HDD 20a, which is the source device of that initialization frame, to the RAID device 20 as a normal device.

Furthermore, unlike the first embodiment, the abnormality detecting unit 24i determines whether the S_ID and the D_ID that are obtained when the initialization frame is sent to the HDD 20a match the S_ID and the D_ID that are obtained when the initialization frame is received from the HDD 20a. For example, as illustrated in FIG. 10, suppose that the "S_ID and D_ID" at the time of the transmission are "11 and 0F" and the "S_ID and D_ID" at the time of the reception are "11 and 0F". In such a case, although the "S_ID and D_ID" are neither "00" nor "EF", the values are the same at the time of the transmission and the reception; therefore, a device in which the abnormality occurs is not the HDD 20a but another device. Accordingly, in the case illustrated in FIG. 10, the abnormality detecting unit 24i determines that the HDD 20a, which is the sending source of the initialization frame, is a normal device.

Furthermore, as illustrated in FIG. 11, suppose that the "S_ID and D_ID" at the time of the transmission are "EF and EF" and the "S_ID and D_ID" at the time of the reception are "11 and 0F". In such a case, the "S_ID and D_ID" at the time of the reception are neither "00" nor "EF", and the values are not the same at the time of the transmission and the reception. Accordingly, in a case illustrated in FIG. 11, the abnormality detecting unit 24i determines that the HDD 20a, which is the sending source of the initialization frame, is an abnormal device. FIGS. 10 and 11 are schematic diagrams illustrating examples of information stored in the identifier DB.

Flow of the Process

Figure 12:
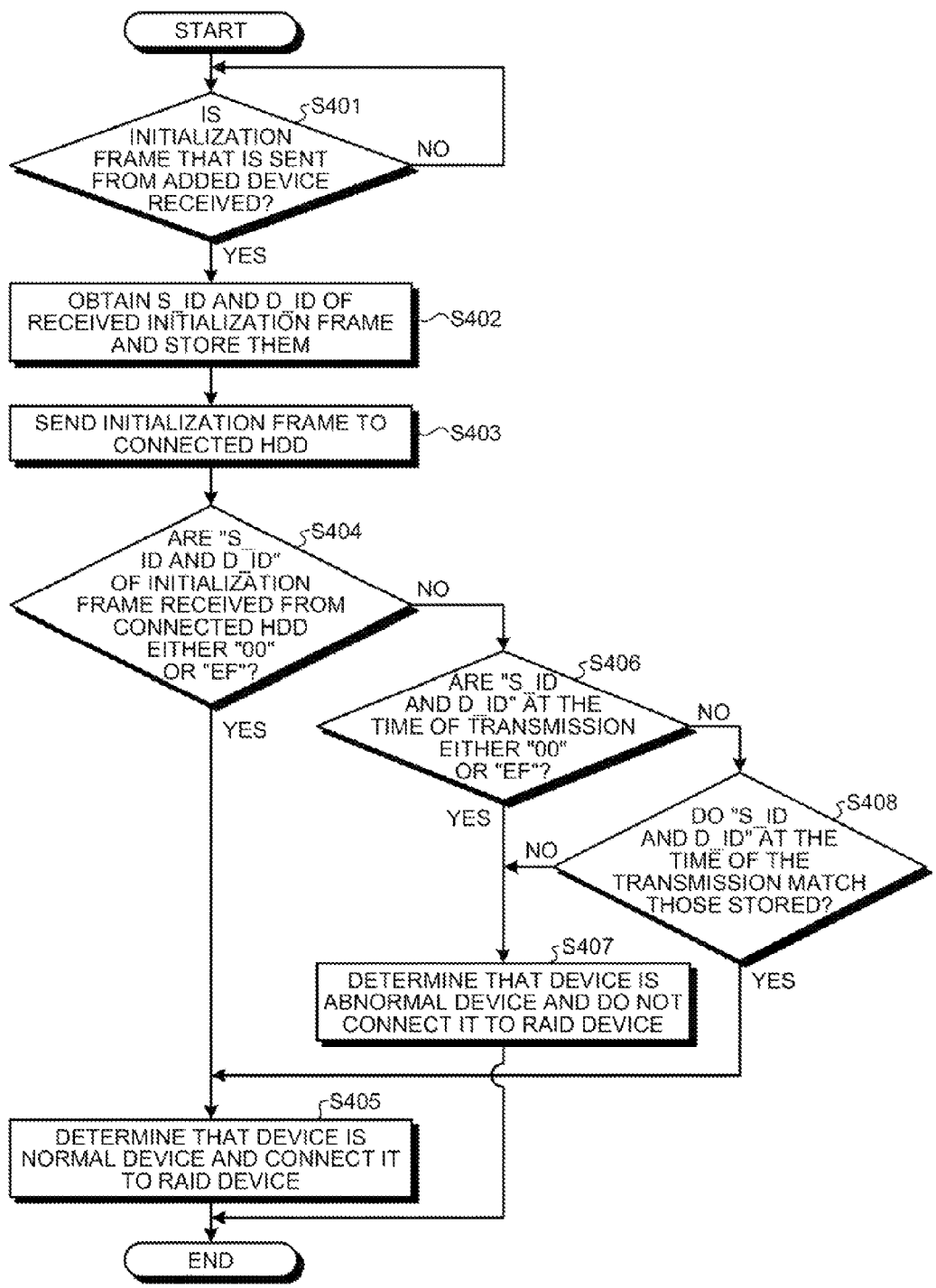
FIG. 12 is a flowchart illustrating the flow of an abnormality detecting process according to the second embodiment.

In the following, the flow of the abnormality detecting process according to the second embodiment will be described with reference to FIG. 12. FIG. 12 is a flowchart illustrating the flow of the abnormality detecting process according to the second embodiment. The process performed in FIG. 12 is a process performed every time the initialization frame is received in FIG. 5. For example, the process is performed at Steps S105, S107, S111, and S113.

As illustrated in FIG. 12, the frame sending unit 24g receives an initialization frame that is sent from an added device (Yes at Step S401). Then, the frame sending unit 24g obtains the S_ID and the D_ID of the received initialization frame and stores them, as the S_ID and the D_ID at the time of the transmission, in the identifier DB 24f (Step S402).

Subsequently, the frame sending unit 24g sends the received initialization frame to the HDD 20a that is connected to the port diagnostic unit 24 (Step S403). Then, if the frame receiving unit 24h receives the initialization frame from the HDD 20a, the abnormality detecting unit 24i determines whether the "S_ID and D_ID" contained in that initialization frame are either "00" or "EF" (Step S404).

If the "S_ID and D_ID" contained in the initialization frame received from the HDD 20a is either "00" or "EF" (Yes at Step S404), the abnormality detecting unit 24i determines that the HDD 20a is normal and maintains the connection to the RAID device 20 (Step S405).

In contrast, if the "S_ID and D_ID" are neither "00" nor "EF" (No at Step S404), the abnormality detecting unit 24i determines whether the "S_ID and D_ID" at the time of the transmission that are stored in the identifier DB 24f are either "00" or "EF" (Step S406).

If the "S_ID and D_ID" at the time of the transmission that are stored in the identifier DB 24f are either "00" or "EF" (Yes at Step S406), the "S_ID and D_ID" at the time of the transmission are different from those at the time of the reception. Accordingly, in such a case, the abnormality detecting unit 24i separates the HDD 20a, as an abnormal device, from the RAID device 20 (Step S407).

In contrast, if the "S_ID and D_ID" at the time of the transmission are neither "00" nor "EF" (No at Step S406), the abnormality detecting unit 24i determines whether the "S_ID and D_ID" at the time of the transmission match those of the reception (Step S408).

If the "S_ID and D_ID" at the time of the transmission match those at the time of the reception (Yes at Step S408), the abnormality detecting unit 24i determines that the HDD 20a is normal and maintains the connection to the RAID device 20 (Step S405). In contrast, if the "S_ID and D_ID" at the time of the transmission do not match those at the time of the reception (No at Step S408), the abnormality detecting unit 24i separates the HDD 20a, as an abnormal device, from the RAID device 20 (Step S407).

Advantage of the Second Embodiment

As described above, according to the second embodiment, it is possible to determine the abnormality with respect to all of the devices in accordance with the initialization frame that is sent from a device, i.e., a newly added HDD. Accordingly, even when a new HDD is added during startup of the RAID device 20, abnormality of the device can be detected at a protocol level without stopping the operation of the RAID device 20 itself.

[c] Third Embodiment

With the RAID device disclosed in the present invention, in addition to detecting an abnormal device in accordance with the S_ID and the D_ID of the initialization frame described in the first and second embodiments, it is also possible to detect an abnormal device in accordance with the WWN contained in the LISM frame. Accordingly, in a third embodiment, an example of detecting an abnormal device in accordance with the WWN contained in the LISM frame will be described.

Configuration of the Port Diagnostic Unit

Figures 13, 14:
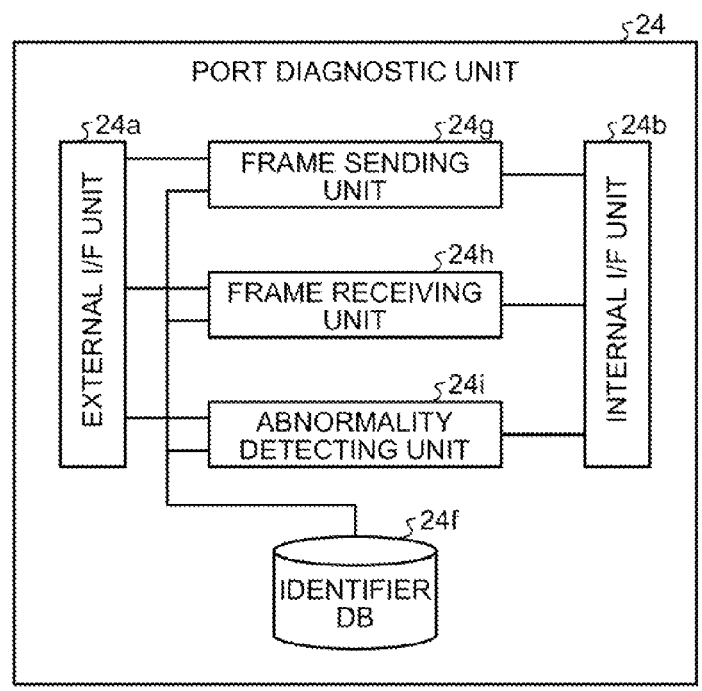
FIG. 13 is a block diagram illustrating, in detail, a port diagnostic unit according to a third embodiment.
FIG. 14 is a schematic diagram illustrating an example of information stored in an identifier DB according to the third embodiment.

First, the configuration of a port diagnostic unit according to the third embodiment will be described with reference to FIG. 13. FIG. 13 is a block diagram illustrating, in detail, the port diagnostic unit according to a third embodiment. As illustrated in FIG. 13, the port diagnostic unit 24 has the external I/F 24a, the internal I/F 24b, the identifier DB 24f, the frame sending unit 24g, the frame receiving unit 24h, and the abnormality detecting unit 24i. The external I/F 24a, the internal I/F 24b, the frame sending unit 24g, and the abnormality detecting unit 24i has the same function as that described in the first embodiment; therefore, a description thereof is omitted here.

In addition to the S_ID and the D_ID at the time of the transmission and the reception, which have been described in the second embodiment, the identifier DB 24f stores therein a WWN contained in the LISM frame that is received from the HDD 20a. For example, as illustrated in FIG. 14, the identifier DB 24f stores therein "00 and EF" as the "S_ID and D_ID" at the time of the transmission; "00 and EF" as the "S_ID and D_ID" at the time of the reception; and "yyyy" as the WWN. FIG. 14 is a schematic diagram illustrating an example of information stored in an identifier DB according to the third embodiment.

In addition to the function described in the first and second embodiments, the frame receiving unit 24h obtains the WWN contained in the LISM frame that is received from the HDD 20a and stores the WWN in the identifier DB 24f. For example, the frame receiving unit 24h obtains the WWN from the "Port name" of the "Payload" of the received LISM frame and stores the WWN in the identifier DB 24f.

Flow of the Process

Figure 15:
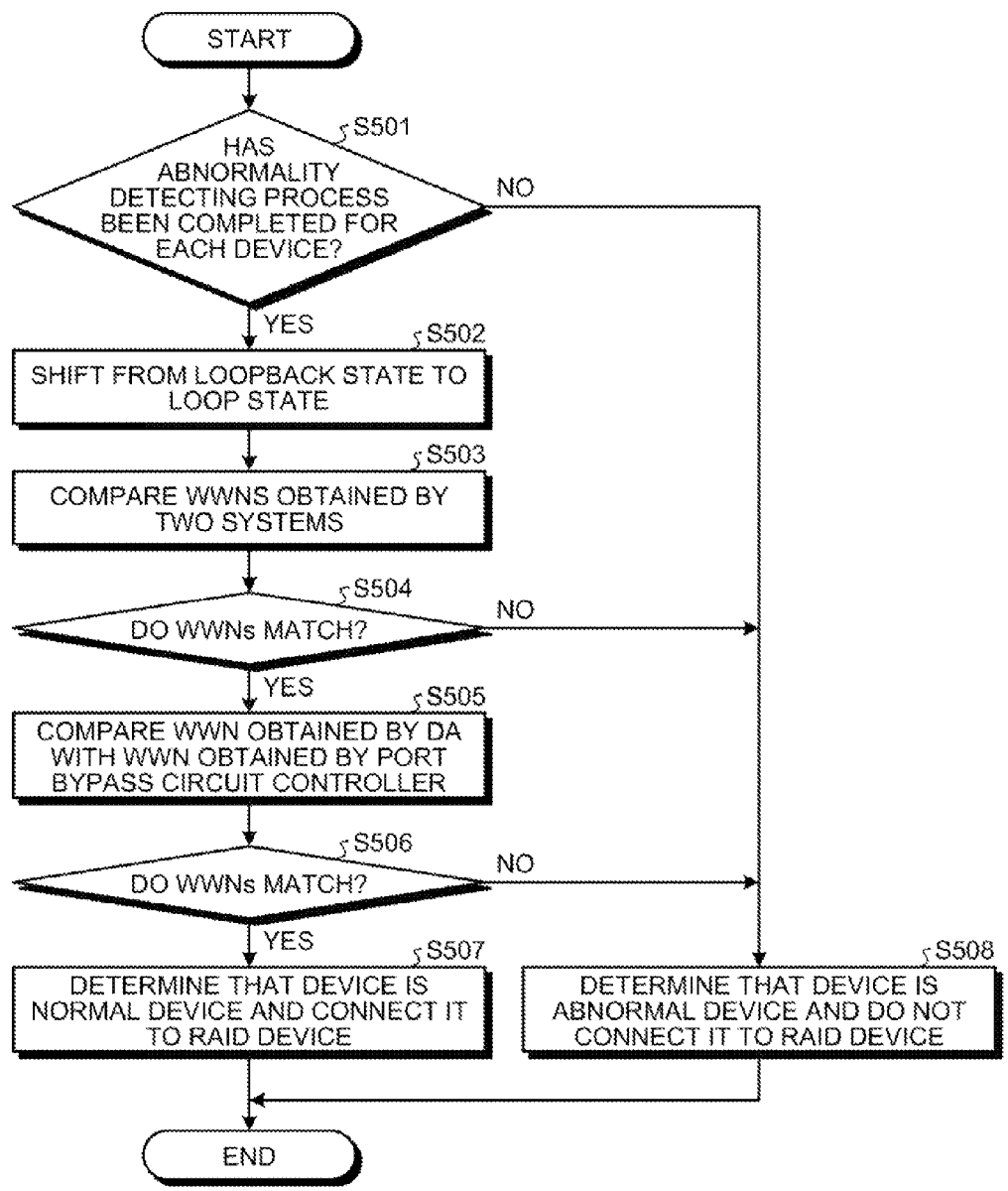
FIG. 15 is a flowchart illustrating the flow of an abnormality detecting process according to the third embodiment.

In the following, the flow of the process in the third embodiment will be described with reference to FIG. 15. FIG. 15 is a flowchart illustrating the flow of an abnormality detecting process according to the third embodiment. This process is performed after Step S102 in FIG. 5. Furthermore, at Step S102 in FIG. 5, the identifier DB 24f stores therein each piece of information.

As illustrated in FIG. 15, if the abnormality detecting process has been completed for each device (Yes at Step S501), the port diagnostic unit 24 shifts the loopback state to the normal loop state (Step S502).

Subsequently, the port bypass circuit controller 23 compares WWNs obtained by two systems connected to the HDD 20a (Step S503). For example, the port bypass circuit controller 23 compares the WWN that is stored in the identifier DB 24f in the port diagnostic unit 24 with the WWN that is stored in the identifier DB in the port diagnostic unit 29. This process is performed on all of the port diagnostic units connected to their corresponding HDD.

Suppose that the port bypass circuit controller 23 determines that the WWNs match (Yes at Step S504). In such a case, the RAID controller 21c determines whether the WWN obtained by the device adapter 21e matches the WWN obtained by the port diagnostic unit 24 (Step S505). The device adapter 21e obtains, at the time of receiving the LISM frame, the WWN using the same method as that used by the port diagnostic unit 24.

Then, suppose that the RAID controller 21c determines that the WWN obtained by the device adapter 21e matches the compared WWN described above (Yes at Step S506). In such a case, the RAID controller 21c determines that the HDD 20a, which is the sending source of the LISM frame, is a normal device and controls the HDD 20a in such a manner that the HDD 20a is connected to the RAID device 20 (Step S507).

In contrast, suppose that the RAID controller 21c determines that the WWN obtained by the device adapter 21e does not match the compared WWN described above (No at Step S506). In such a case, the RAID controller 21c determines that the HDD 20a, which is the sending source of the LISM frame, is an abnormal device and controls the HDD 20a in such a manner that the HDD 20a is not connected to the RAID device 20 (Step S508).

At Step S504, suppose that the port bypass circuit controller 23 determines that both the WWNs do not match (No at Step S504). In such a case, the RAID controller 21c determines that the HDD 20a, which is the sending source of the LISM frame, is an abnormal device and controls the HDD 20a in such a manner that the HDD 20a is not connected to the RAID device 20 (Step S508).

Furthermore, at Step S501, suppose that the abnormality detecting process for each device is not completed (No at Step S501). In such a case, the initialization process is not completed in the loopback state that is shifted by the port diagnostic unit 24. This means that the WWN obtained when the LISM frame is sent to the HDD 20a does not match the WWN obtained when the LISM frame is received from the HDD 20a, i.e., a bit error occurs in the WWN. Accordingly, the port bypass circuit controller 23 determines that the HDD 20a is an abnormal device and controls the HDD 20a in such a manner that the HDD 20a is not connected to the RAID device 20 (Step S508).

Advantage of the Third Embodiment

As described above, according to the third embodiment, it is possible to detect an abnormal device in accordance with a WWN contained in an LISM frame and also possible to detect an abnormal device at a protocol level. Furthermore, after detecting the abnormality using an S_ID and a D_ID, abnormality can further be detected using a WWN; therefore, it is possible to more accurately detect an abnormal device.

[d] Fourth Embodiment

The embodiments of the present invention have been described; however, the present invention is not limited to the embodiments described above and can be implemented with various kinds of embodiments other than the embodiments described above. Therefore, an embodiment different from the above embodiments will be described below.

About Device

In the first to third embodiments, it has been mentioned, as an example, that three HDDs are used as devices for the RAID; however the present invention is not limited thereto. For example, it is possible to use a device other than an HDD and also possible to use three or more devices or less than three devices. Furthermore, the devices are not limited to HDDs. For example, various devices, such as DAs or SSDs, can be used. In the first to third embodiments, a case in which each device has FC I/Fs has been described; however, the present invention is not limited thereto. For example, each device can have another interface.

Combination of the Abnormal Device Detecting Processes

With the RAID device 20 disclosed in the present invention, all of the abnormality detecting processes described in the first to third embodiments can be performed or a single abnormality detecting process described above can be performed and the abnormality detecting processes can be performed in any combination.

Commencement Timing of the Abnormal Device Detecting Process

In the first and third embodiments, a case has been described in which the abnormality detecting process is commenced when the RAID device 20 is started. In the second embodiment, a case has been described in which the abnormality detecting process is commenced when a new HDD is added. However, the present invention is not limited thereto. For example, the abnormal device detecting process disclosed in the first to third embodiments can be performed at an arbitrary time, such as when a failed HDD is separated or when an HDD is replaced. Furthermore, the abnormal device detecting process disclosed in the first to third embodiments can also be performed on a regular basis, such as once in a week.

Efficiency of the WWN Diagnosis

After performing the abnormal device detecting process described in the third embodiment, the RAID device disclosed in the present invention holds WWNs, in the identifier DB or the like for each normal device, as previous WWNs subjected to the initialization process. Then, at the time of the commencement of the subsequent abnormality detecting process, for a device in which a mount signal is not changed, i.e., for a device that is not replaced, the previous WWN subjected to the initialization process is compared with the WWN obtained from the current LISM frame. Then, the RAID device detects, as an abnormal device, a device whose WWN does not match. As a result, for the device in which a mount signal is not changed, Steps S501 to Step S504 in FIG. 15 can be skipped; therefore, the abnormal device detecting process can be efficiently performed.

System

Furthermore, of the processes described in the embodiments, the whole or a part of the processes that are mentioned as being automatically performed can be manually performed or the whole or a part of the processes that are mentioned as being manually performed can be automatically performed using known methods. Furthermore, the process procedures, the control procedures, the specific names, and the information containing various kinds of data or parameters indicated in the above specification and drawings, for example, FIGS. 3 to 11, can be arbitrarily changed unless otherwise noted.

The components of each devices illustrated in the drawings are only for conceptually illustrating the functions thereof and are not necessarily physically configured as illustrated in the drawings. The specific shape of a separate or integrated device is not limited to the drawings. For example, the loopback control unit 24c and the frame receiving unit 24d can be integrated. For example, all or part of the device can be configured by functionally or physically separating or integrating any of the units depending on various loads or use conditions. Furthermore, all or any part of the processing functions performed by each device can be implemented by a CPU and by programs analyzed and executed by the CPU or implemented as hardware by wired logic.

Program

The abnormality detecting method of the device described in the embodiments can be implemented by a program prepared in advance and executed by a computer such as a personal computer or a workstation. The program can be sent using a network such as the Internet. Furthermore, the program can be stored in a computer-readable recording medium, such as a hard disc drive, a flexible disk (FD), a CD-ROM, an MO, and a DVD. The computer can then read and execute the program from the above.

According to an aspect of the RAID device, the abnormal device detecting apparatus, and the abnormal device detecting method disclosed in the present invention, an advantage is provided in that it is possible to detect an abnormal device at a protocol level.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A RAID device comprising:
a plurality of devices for a RAID configuration, that have two-system interfaces;
a control unit that controls the RAID configuration and controls communication between the devices and a host that performs various data processes with respect to the devices;
a frame receiving unit that receives, if an initialization process for assigning a unique physical address to each of the devices is performed, an initialization frame from each of the devices via the paths having the two systems; and
an abnormality detecting unit that determines whether identifiers unique to the devices contained in the initialization frames received by the two systems match, and, if the identifiers do not match, detects a device that has sent the initialization frame as an abnormal device.

2. A RAID device comprising:
a plurality of devices for a RAID configuration;
a control unit that controls the RAID configuration and controls communication between the devices and a host that performs various data processes with respect to the devices;
a frame receiving unit that receives, if an initialization process for assigning a unique physical address to each of the devices is performed, an initialization frame from each of the devices; and
an abnormality detecting unit that detects, if an identifier contained in the initialization frame received by the frame receiving unit is not a predetermined value defined by a fibre channel protocol, a device that has sent the initialization frame as an abnormal device.

3. The RAID device according to claim 2, wherein if the initialization process is performed when the RAID device is started, the frame receiving unit receives the initialization frame by shifting to a loopback connection in which the devices are directly connected.

4. A RAID device comprising:
a plurality of devices for a RAID configuration;
a control unit that controls the RAID configuration and controls communication between the devices and a host that performs various data processes with respect to the devices;
a frame receiving unit that receives, when an initialization process for assigning a unique physical address to each of the devices is performed, an initialization frame from each of the devices;
a frame sending unit that receives an initialization frame sent from another device, holds an identifier contained in the initialization frame, and sends the initialization frame to a device that is directly connected; and
an abnormality detecting unit that compares, if an identifier contained in the initialization frame received by the frame receiving unit is not a predetermined value that is defined by a fibre channel protocol, the identifier contained in the initialization frame received by the frame receiving unit with the identifier held by the frame sending unit and, if the identifiers do not match, detects a device that has sent the initialization frame as an abnormal device.

5. A RAID device comprising:
a plurality of devices, for a RAID configuration, that have two-system interfaces;
a control unit that controls the RAID configuration and controls communication between the devices and a host that performs various data processes with respect to the devices; and
a communication control unit that controls communication between the devices and the control unit using paths having two systems, wherein
if an initialization process for assigning unique physical addresses to devices is performed, the communication control unit receives initialization frames from the devices via the paths having the two systems, determines whether identifiers unique to the devices contained in the initialization frames received by the two systems match, and, if the identifiers do not match, detects a device that has sent the initialization frame as an abnormal device.

6. The RAID device according to claim 5, wherein the control unit receives the initialization frames, obtains the identifiers unique to the devices, and, if the communication control unit determines that the identifiers unique to the devices match, compares an identifier unique to a device obtained by the control unit with an identifier unique to a device obtained by the communication control unit, and, if the identifiers do not match, detects a device that has sent the initialization frame as an abnormal device.

7. An abnormal device detecting apparatus comprising:
a frame receiving unit that receives, if an initialization process for assigning a unique physical address to each of a devices that have two-system interfaces for a RAID configuration is performed, an initialization frame from each of the devices via the paths having the two systems; and
an abnormality detecting unit that determines whether identifiers unique to the devices contained in the initialization frames received by the two systems match, and, if the identifiers do not match, detects a device that has sent the initialization frame as an abnormal device.

8. An abnormal device detecting method comprising:
receiving, on two-system paths between a plurality of devices for a RAID configuration and a control unit that controls the RAID configuration, if an initialization process for assigning physical addresses unique to the devices is commenced, an initialization frame for performing the initialization process from each of the devices;
first detecting, in accordance with information contained in the initialization frame received at the receiving, abnormality of the devices; and
second detecting, by determining whether identifiers unique to the devices contained in the initialization frames received on the two-system paths match, a device that has sent the initialization frame as an abnormal device if the identifiers do not match.

\* \* \* \* \*